United States Patent [19]

Kajino et al.

[11] Patent Number: 5,340,021
[45] Date of Patent: Aug. 23, 1994

[54] AIR CONDITIONING DEVICE FOR VEHICLES

[75] Inventors: Yuuichi Kajino; Hikaru Sugi, both of Nagoya; Koichi Ban, Tokai; Yuuji Honda; Katsuhiko Samukawa, Qoth of Kariya; Takayoshi Kawai, Aichi, all of Japan

[73] Assignee: Nippondenso Co., Ltd., Kariya, Japan

[21] Appl. No.: 957,189

[22] Filed: Oct. 7, 1992

[30] Foreign Application Priority Data

Oct. 8, 1991 [JP] Japan .................. 3-289198

[51] Int. Cl.⁵ .............................. B60H 1/00
[52] U.S. Cl. .................... 236/49.3; 236/91 C
[58] Field of Search ............... 236/49.3, 91 R, 91 C, 236/91 F, 91 E, 91 D; 165/42, 43; 454/75

[56] References Cited

U.S. PATENT DOCUMENTS

| | | | |
|---|---|---|---|
| 4,890,460 | 1/1990 | Takasi et al. | 62/180 |
| 4,949,624 | 8/1990 | Hara et al. | 236/91 C |
| 5,181,654 | 1/1993 | Yoshimi et al. | 236/91 C |
| 5,186,682 | 2/1993 | Iida | 454/75 |
| 5,199,485 | 4/1993 | Ito et al. | 165/43 |

FOREIGN PATENT DOCUMENTS 59-34497 9/1984 Japan .
63-45965 9/1988 Japan .
4-43114 2/1992 Japan .

Primary Examiner—Harry B. Tanner
Attorney, Agent, or Firm—Cushman, Darby & Cushman

[57] ABSTRACT

The object of the present invention is to supply air to passengers in an automobile so that they will feel more comfortable in the presence of solar radiation by suppressing a rise in temperature in a vehicle passenger compartment caused by solar radiation. There is provided a cold air damper which feeds cold air immediately after an evaporator to a face blow port and mixes it with the conditioned air that has passed through an air mixing damper, with the amount of blown air is changed by a blower fan. A control means detects the amount of solar radiation present by using a solar radiation sensor. This invention calculates the temperature of air blown out in the absence of solar radiation, calculates the temperature of air blown out in the presence of solar radiation, calculates a corrected blowing rate according to a thermal equilibrium equation in the presence of solar radiation, and calculates a blowing rate in the presence of solar radiation.

13 Claims, 8 Drawing Sheets

AIR CONDITIONING DEVICE FOR VEHICLES

BACKGROUND OF THE INVENTION

1. Field of the Invention

The present invention relates to an air conditioning device for use in vehicles, and particularly to an air conditioning device which changes the temperature of the blown air and the blowing rate in an optimal manner depending upon the presence or absence of solar radiation in order to maintain a comfortable atmosphere in the passenger compartment of a vehicle.

2. Description of the Related Art

In a conventional air conditioning device for vehicles, the temperature of the blown air and the like are determined depending on a preset temperature and the temperatures inside and outside the vehicle, irrespective of the presence or absence of solar radiation. Therefore, the temperature in the vehicle passenger compartment is subject to undergo a great change depending upon the presence or absence of solar radiation particularly in spring and fall when the solar radiation is strong though the atmospheric temperature is relatively low.

Therefore, it becomes necessary to detect the amount of solar radiation to properly maintain the temperature in the vehicle passenger compartment. However, if the temperature of the blown air is abruptly lowered because the heat is received in large amounts from the solar radiation, the passengers who are directly exposed to the blown air will feel excessively chilled and will find it uncomfortable.

A variety of proposals have heretofore been offered in an attempt to solve the aforementioned problems inherent in the conventional air conditioning devices for vehicles as disclosed in, for example, Japanese Examined Utility Model Publication No. 59-34497 and U.S. Pat. No. 4,890,460. According to these prior arts, the temperature of the air blown into the vehicle passenger compartment is controlled by the use of a solar radiation sensor. Namely, the temperature of the blown air only is controlled, but a comfortable environment is not created in the vehicle passenger compartment by controlling both the temperature of the blown air and the blowing rate simultaneously.

SUMMARY OF THE INVENTION

The present invention is intended to solve the above-mentioned problems and its object is to provide an air conditioning device for vehicles that is capable of suppressing the temperature in the vehicle passenger compartment from being changed by the solar radiation without causing the passengers to feel chilled.

In order to accomplish the above object, the present invention employs the following technical constitution. That is, the invention provides an air conditioning device for vehicles which adjusts the number of revolutions of a blower fan to set the rate of blowing the air to a desired value and adjusts the opening degree of an open/close damper to set the temperature of the blown air to a desired value, comprising:

- a solar radiation detection means which detects the solar radiation;
- a solar radiation-absent blow-out air temperature calculation means which calculates the temperature of the blown air in the absence of solar radiation based on a setpoint temperature and temperatures inside and outside the vehicle;
- a solar radiation-absent blowing rate calculation means which calculates the rate of blowing the air under the temperature condition of the blown air in the absence of solar radiation;
- a solar radiation-present blow-out air temperature calculation means which calculates the temperature of the blown air in the presence of solar radiation based on the solar radiation detected by said solar radiation detection means, a setpoint temperature and temperatures inside and outside the vehicle;
- a solar radiation-present blowing rate calculation means which calculates the rate of blowing the air under the temperature condition of the blown air in the presence of solar radiation; and
- a control means which controls the number of revolutions of said blower fan and the opening degree of said open/close damper based on the results calculated by each of said calculation means.

In the present invention the "rate" means a quantity of air blown in the air passage at an unit time, such as $m^3$/hour, for example.

The fundamental constitution of the present invention is described with reference to FIG. 9, in which the invention is concerned with an air conditioning device which adjusts the number of revolutions of a blower fan to set the rate of blowing the air to a desired value and adjusts the opening degree of an open/close damper to set the temperature of the blown air to a desired value, comprising a solar radiation sensor which detects the solar radiation, a means which calculates the temperature of the blown air in the absence of solar radiation based on a setpoint temperature and temperatures inside and outside the vehicle, a means which determines the rate of blowing the air under the temperature condition of the blown air in the absence of solar radiation, a means which calculates the temperature of the blown air in the presence of solar radiation by correcting the temperature of the blown air of the absence of solar radiation based on the solar radiation that is detected, and a means which calculates the rate of blowing the air in the presence of solar radiation by calculating a blowing rate correction value in compliance with a thermal equilibrium equation under said temperature condition of the blown air in the presence of solar radiation and by correcting the blowing rate in the absence of solar radiation using said blowing rate correction value.

The above-mentioned constitution makes it possible to calculate the temperature of the blown air in the presence of solar radiation that does not cause the passengers to feel chilled by correcting the temperature of the blown air in the absence of solar radiation based on the detected solar radiation. Therefore, the passengers who are directly exposed to the blown air do not find the atmosphere uncomfortable. Moreover, since the blowing rate in the presence of solar radiation is calculated by correcting the blowing rate in the absence of solar radiation in compliance with a thermal equilibrium equation under the temperature condition of the blown air in the presence of solar radiation, the temperature in the vehicle chamber is prevented from greatly changing.

DESCRIPTION OF THE PREFERRED EMBODIMENTS

Embodiments of the air conditioning device for vehicles according to the present invention will now be described in detail in conjunction with the drawings.

Figure 1:
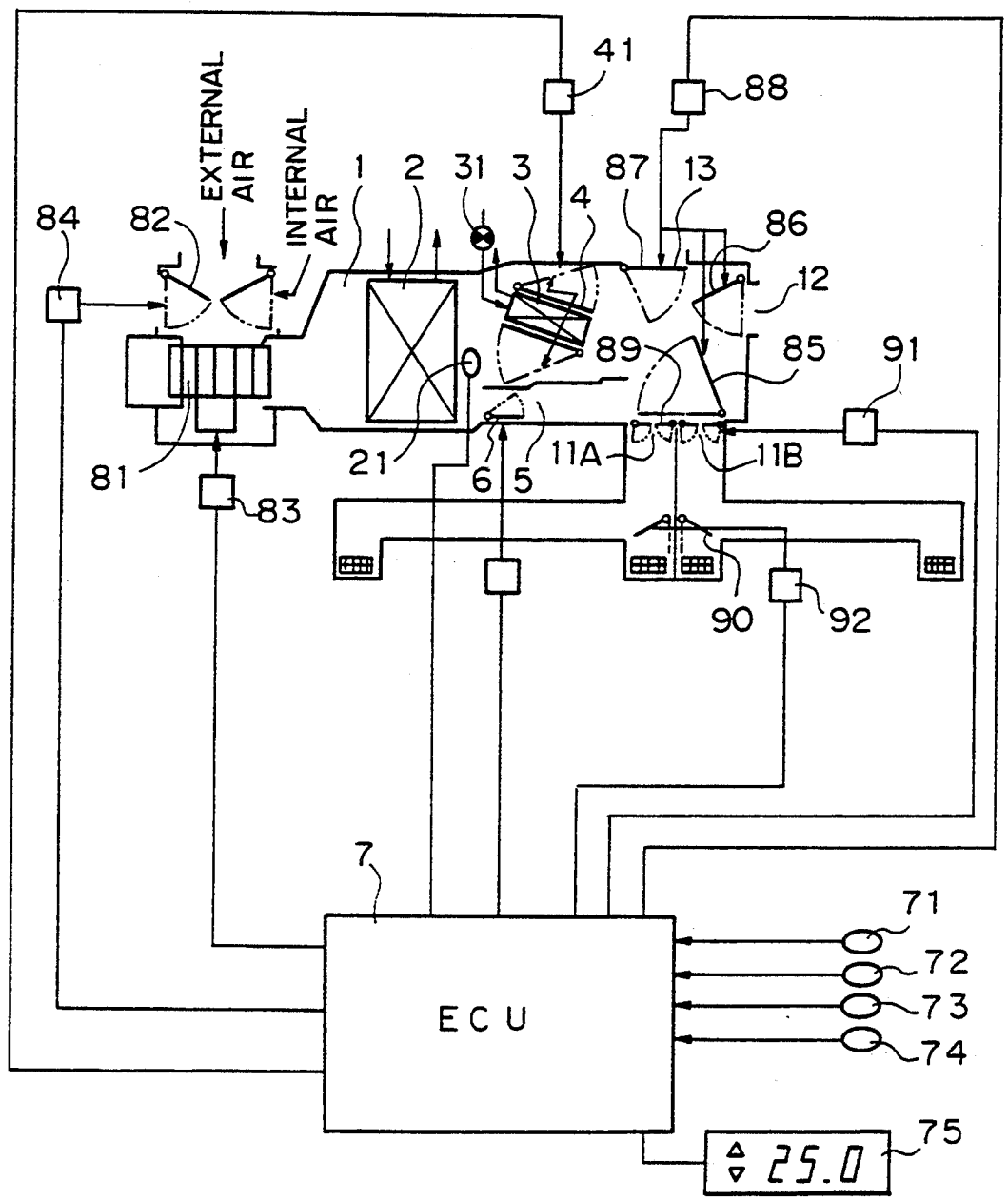
FIG. 1 is a diagram illustrating the whole constitution of an air conditioning device.
Figure 9:
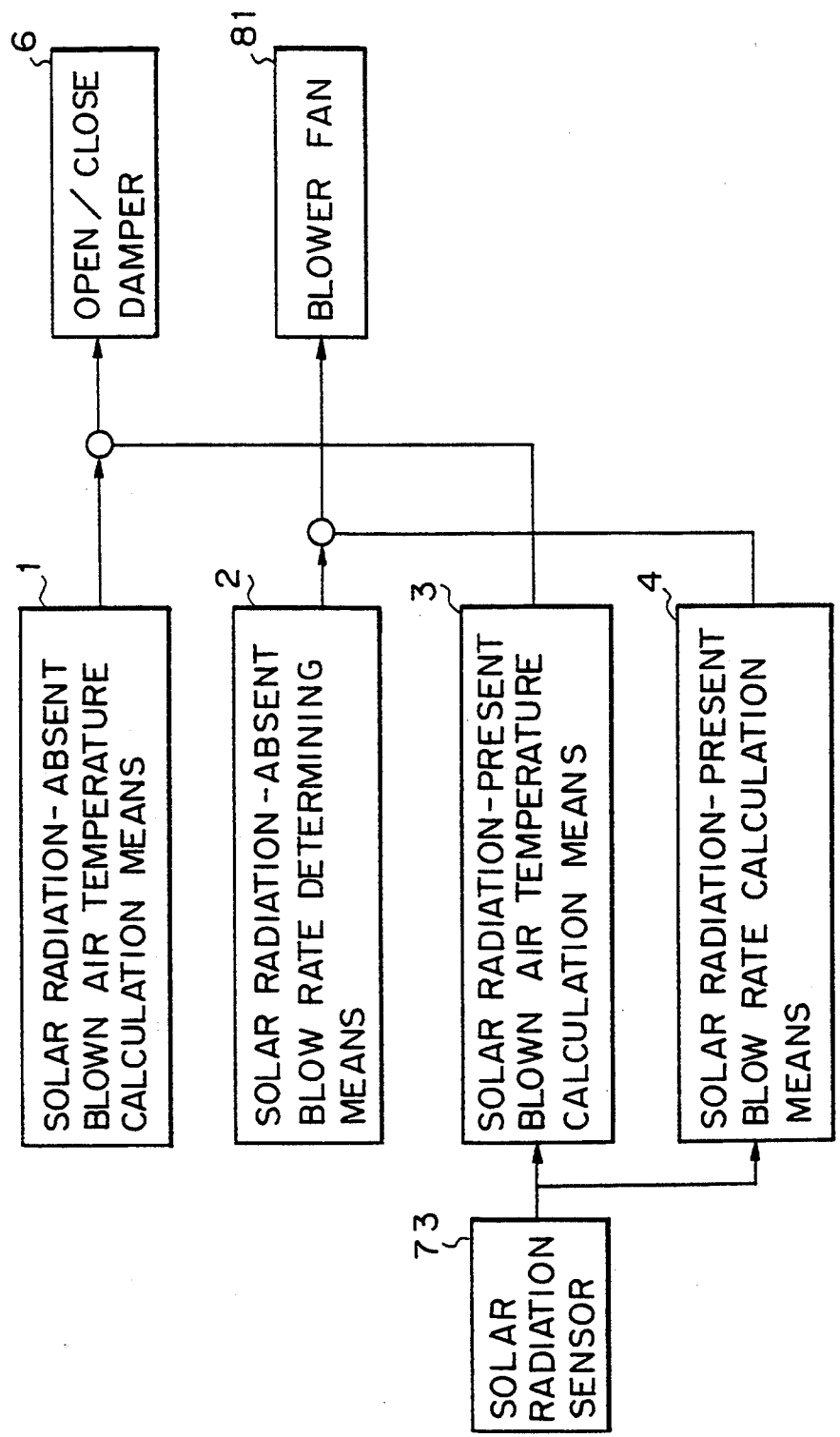
FIG. 9 is a diagram explaining the fundamental principle of the present invention.

FIG. 1 is a block diagram which together with FIG. 9 illustrates an air conditioning device for vehicles according to an embodiment of the present invention. Namely, the air conditioning device for vehicles adjusts the number of revolutions of a blower fan 81 to set the rate of blowing the air to a desired value and adjusts the opening degree of an open/close damper to set the temperature of the blown air to a desired value, and comprises:

- a solar radiation detection means which detects the solar radiations;
- a solar radiation-absent blow-out air temperature calculation means which calculates the temperature of the blown air in the absence of solar radiation based on a setpoint temperature and temperatures inside and outside the vehicle;
- a solar radiation-absent blowing rate calculation means which calculates the rate of blowing the air under the temperature condition of the blown air in the absence of solar radiation;
- a solar radiation-present blow-out air temperature calculation means which calculates the temperature of the blown air in the presence of solar radiation based on the solar radiation detected by said solar radiation detection means, a setpoint temperature and temperatures inside and outside the vehicle;
- a solar radiation-present blowing rate calculation means which calculates the rate of blowing the air under the temperature condition of the blown air in the presence of solar radiation; and
- a control means which controls the number of revolutions of said blower fan and the opening degree of said open/close damper based on the results calculated by each of said calculation means.

According to another embodiment of the present invention, there is provided an air conditioning device for vehicles which adjusts the number of revolutions of a blower fan 81 to set the rate of blowing the air to a desired value and adjusts the opening degree of an open/close damper to set the temperature of the blown air to a desired value, comprising:

- a solar radiation detection means which detects the solar radiation;
- a solar radiation-absent blow-out air temperature calculation means which calculates the temperature of the blown air in the absence of solar radiation based on a setpoint temperature and temperatures inside and outside the vehicle;
- a solar radiation-absent blowing rate calculation means which calculates the rate of blowing the air under the temperature condition of the blown air in the absence of solar radiation;
- a solar radiation-present blow-out air temperature calculation means which calculates the temperature of the blown air in the presence of solar radiation by correcting the temperature of the blown air in the absence of solar radiation based on the solar radiation that is detected by the solar radiation detection means, the setpoint temperature and temperatures inside and outside the vehicle;
- a solar radiation-present blowing rate calculation means which calculates the rate of blowing the air in the presence of solar radiation by calculating a blowing rate correction value in compliance with a thermal equilibrium equation under the temperature condition of the blown air in the presence of solar radiation and by correcting the blowing rate in the absence of solar radiation using the blowing rate correction value; and
- a control means which controls the number of revolutions of the blower fan and the opening degree of said open/close damper based on the results calculated by each of the calculation means.

If described more concretely with reference to FIG. 1, a blower fan 81 is provided in an end of an air conditioning duct 1, and the internal air or the external air selected by an internal air/external air change-over damper 82 is intaken into the duct 1. The number of revolutions of the blower fan 81 is controlled by driving a blower motor through a motor control circuit 83. The internal air/external air change-over damper 82 is opened or closed by a servo motor 84.

In the air conditioning duct 1 is disposed an evaporator 2 which cools the intaken air at a position downstream of the blower fan 81, and further downstream thereof is provided a heater core 3 which occupies nearly one-half the interior of the duct 1 to heat the cooled air. The heater core 3 is equipped with an air-mixing (A/M) damper 4. By changing the opening degree of the damper 4 using a servo motor 41, the air is adjusted to a predetermined temperature. The temperature of the cooled air flowing out through the evaporator 2 is maintained constant owing to the output of a temperature sensor 21 which is provided immediately after the evaporator 2. The cooling water of the engine is supplied to the heater core 3 via a water valve 31.

In the air conditioning duct 1 is provided a partitioning wall along the duct wall just after the evaporator 2 detouring the heater core 3 thereby to form a by-pass duct 5. The downstream opening of the duct 5 leads to a change-over damper 85 of face blow ports 11A and 11B provided at the other end of the air conditioning duct 1. At the above other end of the air conditioning duct are further formed a foot blow port 12 and a defroster blow port 13 which are, respectively, provided with change-over dampers 86 and 87 that are coupled to the change-over damper 85 through links and are driven by a servo motor 88 in an interlocked manner.

A damper 89 for adjusting the blowing rate of the right and left sides is provided for the pair of right and left face blow ports 11A and 11B, and a damper 90 for adjusting the blowing rate is provided for the face blow center grill, the dampers 89 and 90 being adjusted in their degree of opening by servo motors 91 and 92.

The A/M damper 4, cold wind damper 6, as well as other dampers 82, 85, 86, 87, 89, 90 and the blower fan 81 are operated by the outputs of a central control circuit (ECU) 7 which determines the opening degrees of the A/M damper 4 and like dampers based on signals from an indoor temperature sensor 71, an external air temperature sensor 72, a solar radiation sensor 73 that detects the quantity of solar radiation, a cooling-water temperature sensor 74, and a setpoint temperature set by a setpoint temperature generator 75.

Figure 6:
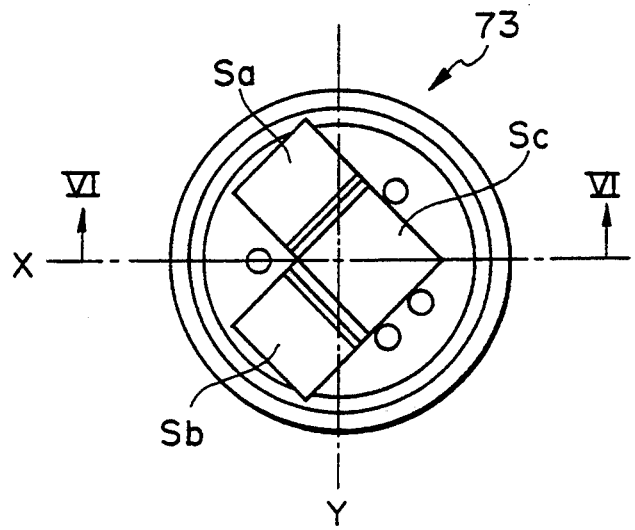
FIG. 6 is a plan view of a solar radiation sensor.
Figure 7:
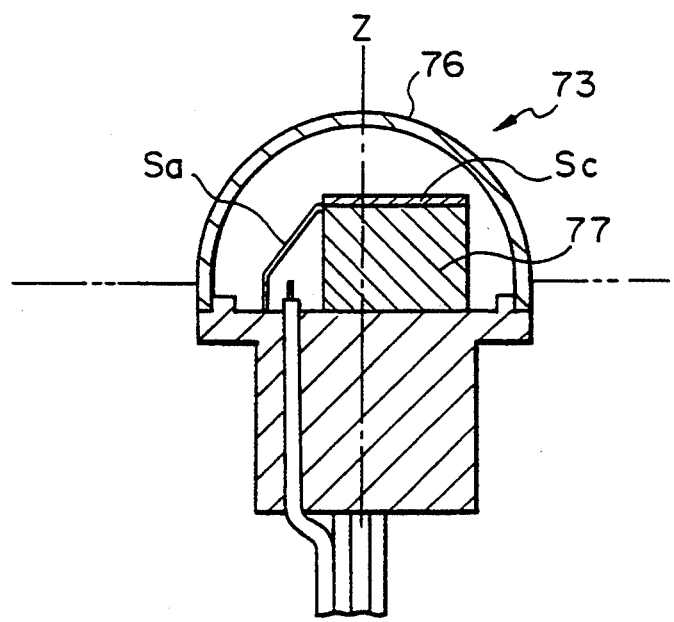
FIG. 7 is a sectional view along the line VI—VI of FIG. 6.

The solar radiation sensor 73 may be the one that is shown in, for example, FIGS. 6 and 7, wherein three square light-receiving elements Sa, Sb and Sc are provided on a base plate 77 inside a semi-spherical cover 76, the light-receiving element Sc being horizontally arranged, and the light-receiving elements Sa and Sb are arranged tilted from the horizontal direction at symmetrical positions with respect to an X-axis which is headed toward the front of the vehicle.

Figure 8:
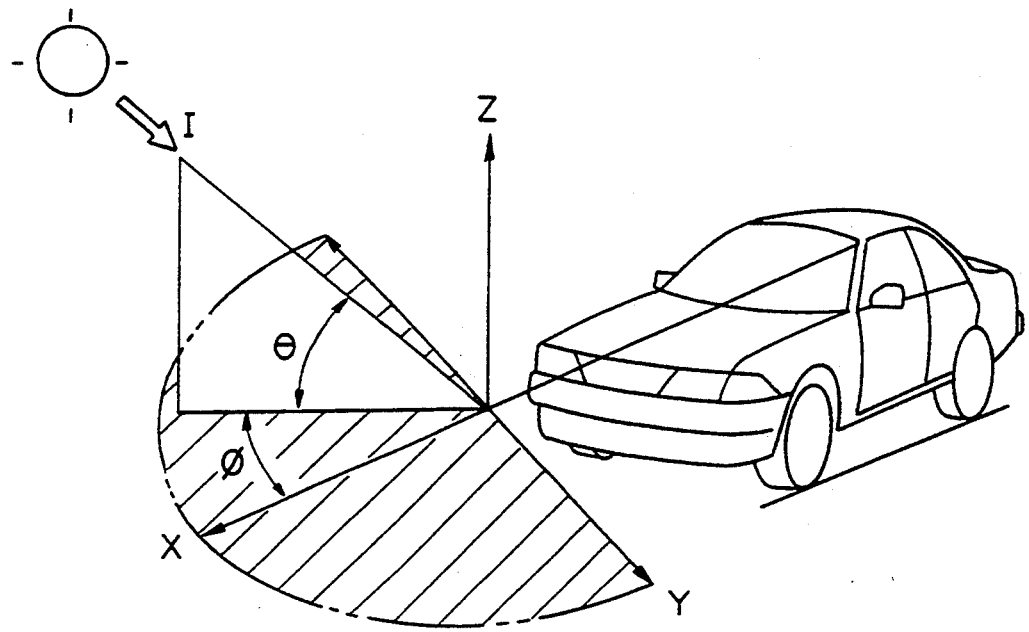
FIG. 8 is a diagram illustrating the angles of solar radiation.

If the angles of the light-receiving elements Sa and Sb with respect to the X-axis are each, for example, 45° and the angles of inclination of the light-receiving elements with respect to the vertical axis Z are each, for example, 57.66°, then the elevation angle $\theta$ of solar radiation, azimuth $\phi$ of solar radiation and quantity I of solar radiation shown in FIG. 8 are obtained in compliance with the following equations ①, ② and ③, $$\theta = \cos^{-1}\sqrt{\frac{(ia-ib)^2 + (ia+ib-1.07ic)^2}{1.426ic^2 + (ia-ib)^2 + (ia+ib-1.07ic)^2}} \quad ①$$

$$I = ic/\sin\theta \quad ②$$

$$\phi = \cos^{-1}\left(\frac{ic+ib-1.07ic}{1.194ic \cdot \cos\theta/\sin\theta}\right) \quad ③$$

where ia, ib and ic denote output currents of the light-receiving elements Sa, Sb and Sc.

In spring when the external temperature is relatively low, the thus constituted air conditioning device must supply cold air to the upper half of the body of the passenger who receives the solar radiation and must supply hot air to the lower half body. Therefore, the ECU 7 confirms the selection of the B/L mode, i.e., confirms the selection of a mode in which the damper 85 of the face blow ports 11A, 11B and the damper 86 of the foot blow port 12 are both open, and causes air of a predetermined temperature to be blown through the blow ports 11A, 11B and 12.

That is, when the opening degree of the A/M damper 4 is adjusted, the air that has passed through the heater core 3 and the air that has not passed therethrough are mixed together at the downstream position, and the conditioned air having a predetermined temperature is delivered to the blow ports 11A, 11B and 12. Then, the conditioned air is delivered into the passenger compartment from the foot blow port 12, and the cold air that is dependent upon the opening degree of the cold air damper 6 is delivered through the face blow ports 11A and 11B as the blown air having a low temperature being mixed with the above conditioned air.

Figure 2:
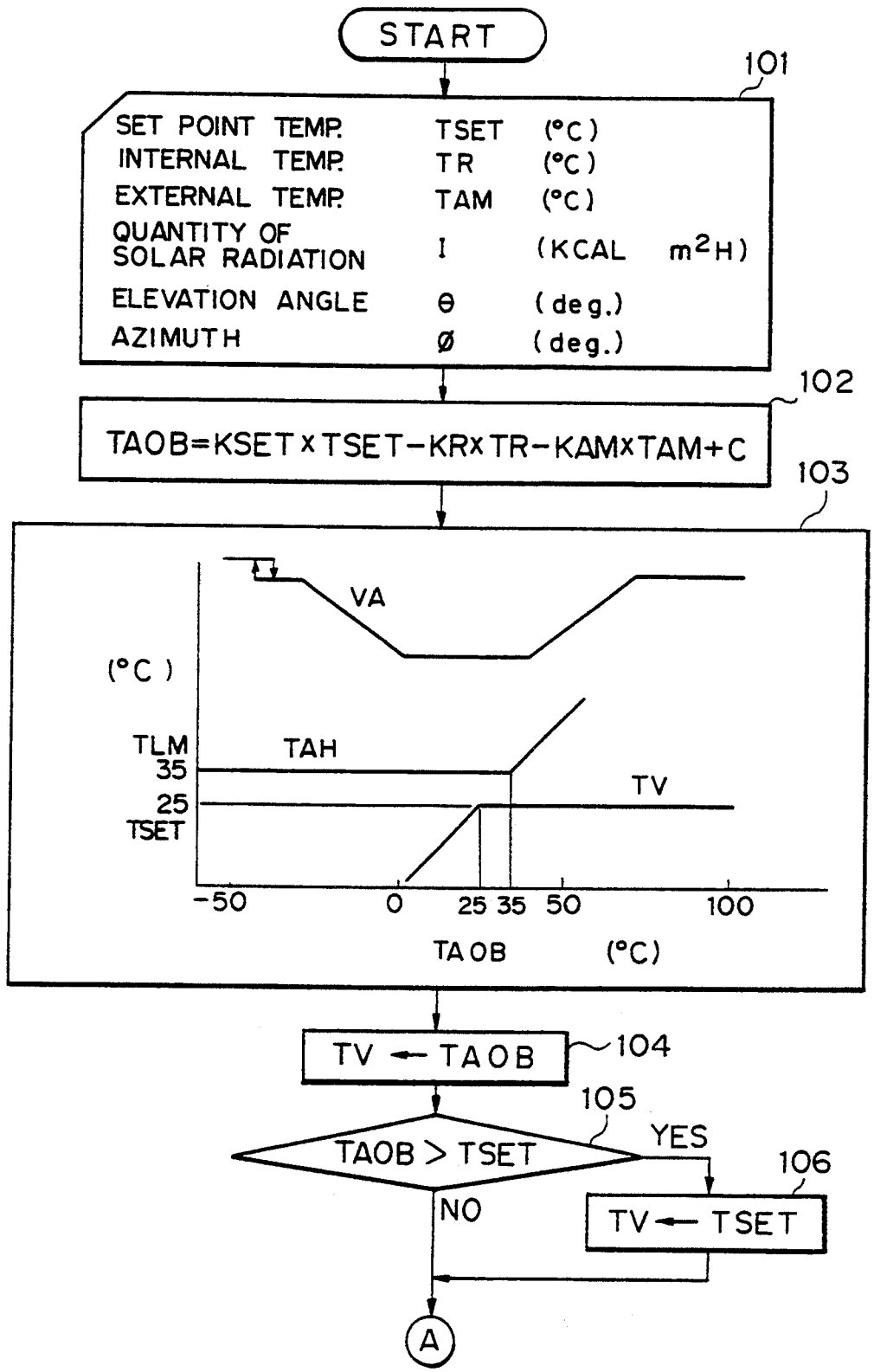
FIGS. 2 through 5 are flow charts of a control circuit.

Described below in detail is the procedure of control by the ECU 7. At a step 101 of FIG. 2, the setpoint temperature TSET, internal temperature TR and external temperature TAM are read from the sensors, and the quantity I of solar radiation, elevation angle $\theta$ and azimuth $\phi$ are read from the solar radiation sensor 73.

At a step 102, a desired blow-out temperature TAOB is calculated in accordance with the following equation ④

$$TAOB = KSET \times TSET = KR \times TR - KAM \times TAM + C \quad ④$$

where KSET, KR, KAM and C are constants.

A step 103 tentatively determines the whole amount VA of the air depending upon a value TAOB. In the absence of the solar radiation, the blow-out temperature TV from the face blow ports 11A, 11B and the blow-out temperature TAH from the foot blow port 12 are found from the steps that will be described below. However, the upper limit of TV is TSET (25° C. in this embodiment) so that the passenger will not feel the air blown to his face uncomfortable, and the lower limit of TAH is TLM (35° C. in this embodiment) so that the passenger will not feel the air around his feet cold.

That is, the desired blow-out air temperature TAOB is set at a step 104 as a blow-out air temperature TV in the absence of solar radiation. When TAOB>TSET, however, TSET is set as TV (steps 105, 106).

Figure 3:
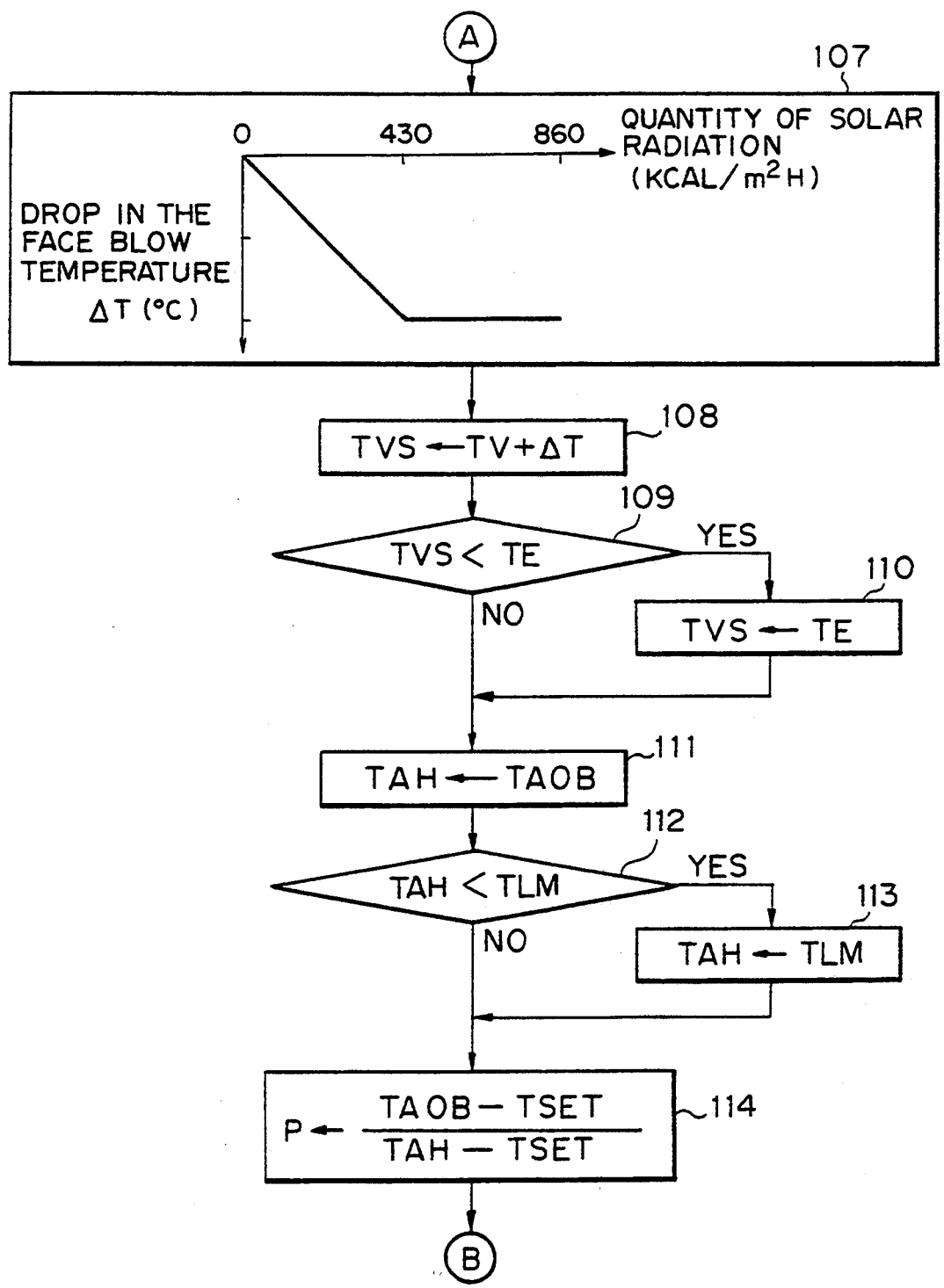

At a step 107 of FIG. 3, a predetermined drop $\Delta T$ in the blow-out temperature is found depending on the quantity I of solar radiation, and $\Delta T$ is added to the blow-out air temperature TV at a step 108 to calculate the blow-out air temperature TVS in the presence of solar radiation. The temperature TVS is set to such a value that the passenger in the presence of solar radiation will feel the air blown from the face blow port comfortable. When the temperature TVS that is calculated is lower than a temperature TE (lower-limit temperature of the cold air by the evaporator immediately after the evaporator 2), TE is set as TVS (steps 109, 110).

At a step 111, TAOB is set as the blow-out air temperature TAH from the foot blow port. The temperature TAH is never set lower than TL so that the passenger will not feel the air to be cold around his feet (steps 112, 113).

Figure 4:
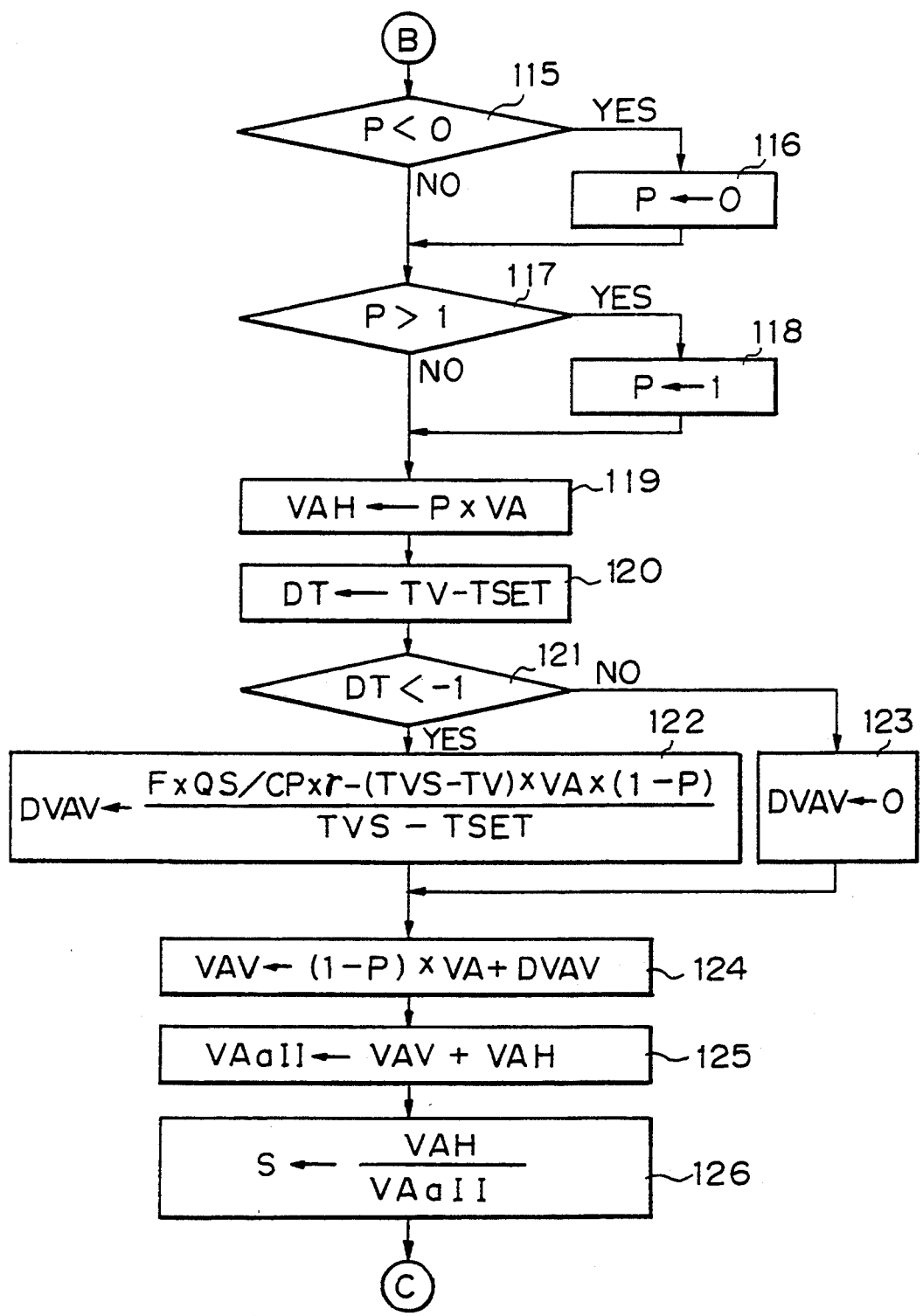

A tentative air blow distribution ratio P to the foot blow port is determined at a step 114 in FIG. 3 and at steps 115 to 118 of FIG. 4. This is done by calculating P from the following equation ⑤, and the B/L mode is selected when O<P<1, the face mode is selected when P<O and in which P is presumed to be 0 (steps 115, 116) and the face blow port only is opened, and the foot mode is selected when P>1 and in which the foot blow port only is opened, $$P = (TAOB - TSET)/(TAH - TSET) \quad ⑤$$

At a step 119, the amount of the air VAH blown to the feet is calculated as P×VA. Then, at a step 120, a difference DT is calculated between the blow-out air temperature TV and the setpoint temperature TSET in the absence of solar radiation. When DT<−1 does not hold (i.e., when the difference DT lies in a small range), the program proceeds from a step 121 to a step 123 where the increment DVAV in the amount of the air is set to 0. In the case when DT<−1, a step 122 calculates the increment DVAV in the amount of the air in compliance with the following equation ⑥ which is a thermal equilibrium equation as expressed by,

| Amount of heat supplied in the presence of solar radiation | = | Amount of heat supplied in the absence of solar radiation | + | Increment of thermal load to the vehicle due to solar radiation |
|---|---|---|---|---|

That is, $$Cp \times \gamma \times (TVS - TSET) \times \{(1-P) \times VA + D\text{-}VAV\} = Cp \times \gamma \times (TV - TSET) \times (1-P) \times VA + Qs$$

where Cp is a specific heat and $\gamma$ is a specific weight of the air.

This can be rewritten as the following equation (6), $$DVAV = \frac{F \times Qs/Cp \times \gamma - (TVS - TV) \times VA \times (1 - P)}{TVS - TSET} \quad (6)$$

where the increment Qs (Kcal/m$^2$.h) of the thermal load has a map of Qs that varies depending upon the elevation angle $\theta$ of solar radiation and the azimuth $\phi$ of solar radiation under the solar radiation quantity I', and is obtained by multiplying the value of the map by I/I', and F is a coefficient for adjusting Qs.

At a step 124, the amount of the air VAV blown to the face is calculated by adding DVAV obtained at the step 122 to (1−P)×VA and at a subsequent step 125, the total amount of the air VAall is finally obtained by adding VAH (see step 119) to VAV.

Figure 5:
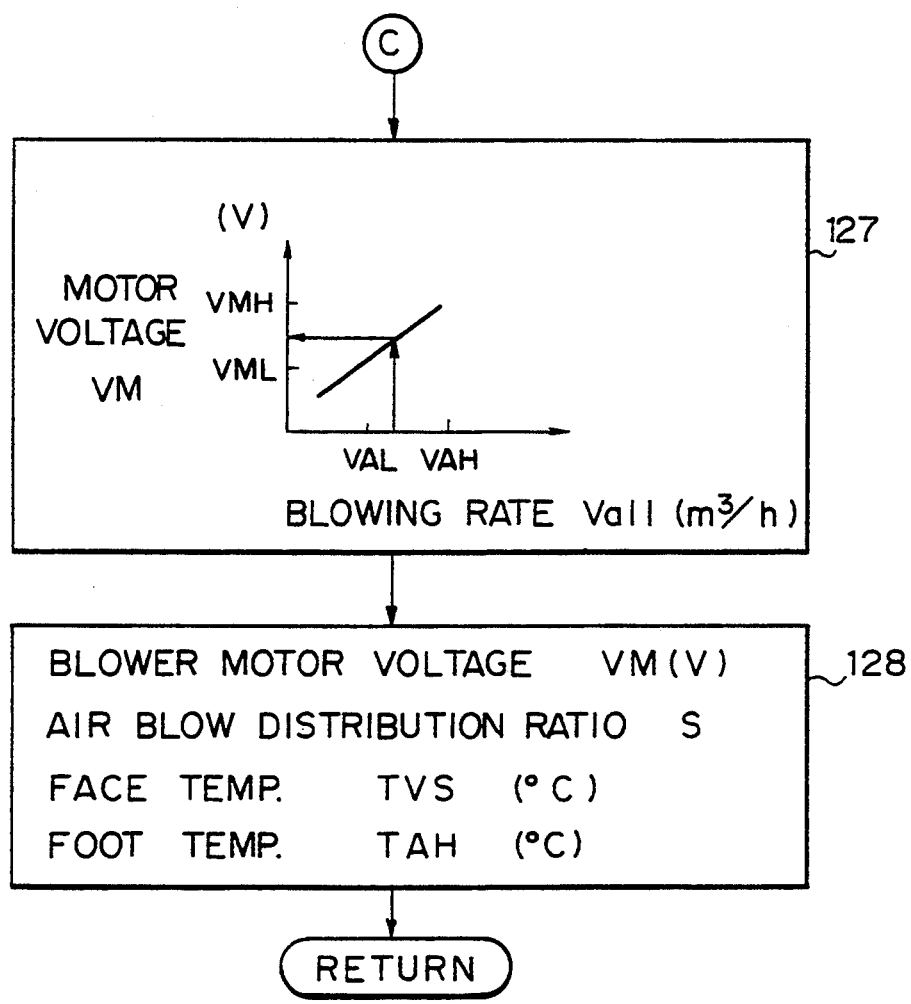

At a step 126, the air blow distribution ratio S is finally determined from S=VAH/VAall to determine the opening degrees of the dampers 85 and 86, and then a blower motor voltage VM is determined (step 127 in FIG. 5) to obtain the total amount of the air. The following are output: a voltage VM, an air blow distribution ratio S, a face blow-out air temperature TVS in the presence of solar radiation, and a foot blow-out air temperature TAH (step 128).

In the above step 107, the drop $\Delta T$ in the blow-out temperature may be changed depending upon the thermal load increment Qs instead of depending upon the quantity I of solar radiation.

In the above embodiment, furthermore, a desired face blow air temperature is obtained by mixing the cold air that has passed through the cold air damper into the conditioned air that has passed through the A/M damper that determines the foot blow-out air temperature. It is, however, also allowable to quite independently provide a system for adjusting the temperature of the air blown to the face, as a matter of course.

By using the air conditioning device for vehicles of the present invention as described above, it is possible to supply the air which the passengers find comfortable in the presence of solar radiation and to effectively suppress the change in the temperature in the vehicle passenger compartment caused by the solar radiation.

We claim:

1. A method of air conditioning a vehicle which adjusts the number of revolutions of a blower fan to set the rate of blowing an amount of blown air to a desired value and adjusts the opening degree of an open/close damper to set the temperature of said blown air to a desired value comprising the steps of:

detecting an amount of solar radiation;
   calculating a solar radiation-absent blow out air temperature by calculating the temperature of an amount of blown air in the absence of solar radiation based on a setpoint temperature and an inside and an outside temperature relative to said vehicle;
   calculating a solar radiation-absent blowing rate by calculating the rate of blowing air based on said temperature of said blown air in the absence of solar radiation;
   calculating a solar radiation-present blow-out air temperature by calculating the temperature of said blown air in the presence of solar radiation by adjusting said temperature of said blown air in the absence of solar radiation based on said amount of solar radiation detected, said setpoint temperature and said inside and said outside temperatures;
   calculating a solar radiation-present blowing rate by calculating the rate of blowing said blown air in the presence of solar radiation by calculating a blowing rate adjustment value in compliance with a thermal equilibrium equation of said temperature of blown air in the presence of solar radiation, and correcting said blowing rate in the absence of solar radiation using said blowing rate adjustment value;
   controlling said number of revolutions of said blower fan and said opening degree of said open/close damper based on the results calculated by each of said calculating steps;
   calculating a difference between a temperature of an amount of air blown out from a face blow port in the absence of solar radiation from said solar radiation-absent blowing rate calculation step, and said setpoint temperature;
   setting an increment in the amount of the air blown from said face blow port to zero when said temperature difference is smaller than a predetermined value; and
   setting a value found from said thermal equilibrium equation of said temperature of blown air in the presence of solar radiation as said increment of the amount of said air blown from said face blow port when said temperature difference is greater than said predetermined value.

2. An air conditioning device for a vehicle which adjusts the number of revolutions of a blower fan to set the rate of blowing an amount of blown air to a desired value and adjusts an opening degree of an open/close damper to set the temperature of said blown air to a desired value, comprising:

solar radiation detection means which detects an amount of solar radiation;
   solar radiation-absent blow-out air temperature calculation means which calculates a temperature of said blown air in the absence of solar radiation based on a setpoint temperature and an inside and an outside temperature relative to said vehicle;
   solar radiation-absent blowing rate calculation means which calculates a rate of blowing of said blown air in the absence of solar radiation;
   solar radiation-present blow-out air temperature calculation means which calculates a temperature of said blown air in the presence of solar radiation based on said amount of solar radiation detected by said solar radiation detection means, said setpoint temperature, and said inside and said outside temperatures;
   solar radiation-present blowing rate calculation means which calculates a rate of blowing said blown air in the presence of solar radiation;
   control means for controlling said number of revolutions of said blower fan and said opening degree of said open/close damper based on a result calculated by each of said temperature and blowing rate calculation means; and
   calculation means which calculates a desired blow-out air temperature based on said setpoint temperature, and said inside and said outside temperatures.

3. An air conditioning device for a vehicle according to claim 2, wherein said solar radiation-absent blow-out temperature calculation means further comprises an arithmetic means which performs arithmetic processing to set said temperature of said blown air from a face blow port to an upper limit temperature when said desired blow-out air temperature in the absence of solar radiation is higher than a predetermined setpoint value.

4. An air conditioning device for a vehicle according to claim 2, wherein said solar radiation-present blow-out air temperature calculation means further comprises a storage means which stores an amount of drop ΔT of said blown air temperature to decrease said temperature of said blown air from a face blow port in response to said detected amount of solar radiation.

5. An air conditioning device for a vehicle according to claim 4, where said solar radiation-present blow-out air temperature calculation means further comprises an arithmetic means which adjusts said temperature of said blown air from said face blow port in response to said detected amount of solar radiation, and calculates said temperature of said blown air in the presence of solar radiation by using said amount of drop ΔT of said blown air temperature from said storage means.

6. An air conditioning device for a vehicle which adjusts the number of revolutions of a blower fan to set the rate of blowing an amount of blown air to a desired value and adjusts an opening degree of an open/close damper to set the temperature of said blown air to a desired value, comprising:
    solar radiation detection means which detects an amount of solar radiation;
    solar radiation-absent blow-out air temperature calculation means which calculates a temperature of said blown air in the absence of solar radiation based on a setpoint temperature and an inside and an outside temperature relative to said vehicle;
    solar radiation-absent blowing rate calculation means which calculates a rate of blowing of said blown air in the absence of solar radiation;
    solar radiation-absent blow-out air temperature calculation means which calculates a temperature of said blown air in the presence of solar radiation based on said amount of solar radiation detected by said solar radiation detection means, said setpoint temperature, and said inside and said outside temperatures;
    solar radiation-present blowing rate calculation means which calculates a rate of blowing said blown air in the presence of solar radiation;
    control means for controlling said number of revolutions of said blower fan and said opening degree of said open/close damper based on a result calculated by each of said temperature and blowing rate calculation means;
    calculation means which calculates a desired blow-out air temperature based on said setpoint temperature, and said inside and said outside temperatures, in order to set said temperature of said blown air to a desired value;
    wherein:
    said solar radiation-absent blowing rate calculation means comprises a storage means which stores a predetermined curve of said rate of blowing of said blown air in the absence of solar radiation in response to said desired blow-out air temperature TAOB; and
    said solar radiation-absent blow-out air temperature calculation means comprises a storage means which stores a predetermined curve of the temperature of the air that has a predetermined lower limit value and that is blown from a foot blow port in response to said desired blow-out air temperature TAOB as well as a predetermined curve of the temperature of the air that has an upper limit value and that is blown from a face blow port.

7. An air conditioning device for a vehicle which adjusts the number of revolutions of a blower fan to set the rate of blowing an amount of blown air to a desired value and adjusts the opening degree of an open/close damper to set the temperature of said blown air to a desired value, comprising:
    solar radiation detection means which detects an amount of solar radiation;
    solar radiation-absent blow-out air temperature calculation means which calculates said temperature of said blown air in the absence of said solar radiation based on a setpoint temperature and an inside and outside temperature relative to said vehicle;
    solar radiation-absent blowing rate calculation means which calculates said rate of blowing of said blown air in the absence of solar radiation;
    solar radiation-present blow-out air temperature calculation means which calculates said temperature of said blown air in the presence of solar radiation based on said solar radiation detected by said solar radiation detection means, a setpoint temperature and said inside and outside temperatures;
    solar radiation-present blowing rate calculation means which calculates said rate of blowing said blown air in the presence of solar radiation;
    control means which controls said number of revolutions of said blower fan and said opening degree of said open/close damper based on a result calculated by each of said temperature and blowing rate calculation means;
    calculation means which calculates a desired blow-out air temperature TAOB based on said setpoint temperature, said inside and outside temperatures in order to set said temperature of said blown air to a desired value; and
    arithmetic means which calculates an amount of air blown out from a foot blow port based upon said desired blow-out air temperature, a temperature of air blown out from said foot blow port, and said setpoint temperature.

8. An air conditioning device for a vehicle which adjusts the number of revolutions of a blower fan to set the rate of blowing air to a desired value, and adjusts the opening degree of an open/close damper to set the temperature of said blown air to a desired value, comprising:
    solar radiation-detection means which detects an amount of solar radiation;
    desired blow-out temperature calculation means which calculates a desired blow-out temperature in the absence of solar radiation based on a setpoint temperature and a temperature inside and a temperature outside of said vehicle;
    solar radiation-absent blow-out air temperature calculation means which calculates a temperature of said blown air in the absence of solar radiation, based on said desired blow-out temperature in the absence of solar radiation;
    solar radiation-absent blowing rate calculation means which calculates a rate of blowing air at a desired temperature in the absence of solar radiation;
    solar radiation-present blow-out air temperature calculation means which calculates a temperature of blown air in the presence of solar radiation, based on said amount of solar radiation detected by said solar radiation detection means, and on said desired blow-out temperature in the presence of solar radiation;

flow rate adjusting calculation means for calculating the blowing rate adjusting value in the presence of solar radiation;

solar radiation-present blowing rate calculation means which calculates a rate of blowing air by adding said blowing rate adjusting value to said rate of blowing air in the absence of solar radiation; and control means for controlling said number of revolutions of said blower fan, and the degree of opening of said open/close damper, based on the results of the calculation of at least said solar radiation-absent blow-out air temperature calculation means; said solar radiation-absent blow-out air temperature calculation means; said solar radiation-present blow-out air temperature calculation means; and said solar radiation-present blowing rate calculation means.

9. An air conditioning device for a vehicle which adjusts the number of revolutions of a blower fan in order to set the rate of blowing air to a desired value, and which adjusts a degree of opening of an open/close damper, to set a temperature of the blown air to a desire value, comprising:

solar radiation-detection means which detects solar radiation;

desired blow-out temperature calculation means which calculates a desired blow-out temperature in the absence of solar radiation, based on a setpoint temperature and a temperature inside and a temperature outside of said vehicle;

solar radiation-absent blow-out air temperature calculation means which calculates a temperature of blown air in the absence of solar radiation, based on said setpoint temperature, and utilizing at least a part of a region in which said desired blow-out air temperature is varied;

solar radiation-absent blowing rate calculation means which calculates a rate of blowing air in the absence of solar radiation;

solar radiation present blow-out air temperature calculation means which calculates a temperature of blown air in the presence of solar radiation, based on said amount of solar radiation detected by said solar radiation detection means and on said desired blow-out temperature calculated in the absence of solar radiation;

blowing rate-adjusting value calculation means for calculating a blowing rate adjusting value in the presence of solar radiation;

solar radiation-present blowing rate calculation means which calculates a rate of blowing air, by adding said blowing rate adjusting value to said rate of blowing air under temperature conditions of the blown air in the absence of solar radiation; and control means for controlling the number of revolutions of said blower fan and said degree of opening of said open/close damper, based on a resulting calculation of at least said solar radiation-absent blow-out air temperature calculation means; said solar radiation-absent blowing rate calculation means; said solar radiation-present blow-out air temperature calculation means; and said solar radiation-present blowing rate calculation means.

10. An air conditioning device for a vehicle according to claim 8 or 9, wherein said temperature of said blown air in the presence of solar radiation further comprises a limited drop of temperature with an increase in said detected amount of solar radiation.

11. An air conditioning device for a vehicle which adjusts the number of revolutions of a blower fan to set the rate of blowing air to a desired value, and adjusts the degree of opening of an open/close damper so as to set the temperature of blown air to a desired value, comprising:

solar radiation detection means which detects solar radiation;

desired blow-out air temperature calculation means which calculates a desired blow-out air temperature in the absence of solar radiation, based on a setpoint temperature and on a temperature inside and a temperature outside of said vehicle;

solar radiation-absent blow-out air temperature calculation means which calculates a temperature of blown air in the absence of solar radiation, based on the desired blow-out temperature in the absence of solar radiation;

solar radiation-absent blowing rate calculation means which calculates a rate of blowing air in the absence of solar radiation;

solar radiation-present blow-out air temperature calculation means which calculates a temperature of said blown air in the presence of solar radiation by adjusting said temperature of said blown air in the absence of solar radiation, based on said amount of solar radiation detected by said solar radiation detection means;

blowing rate adjusting value calculation means for calculating said blowing rate adjusting value, in compliance with a thermal equilibrium equation in the presence of solar radiation;

solar radiation-present blowing rate calculation means which calculates a rate of blowing air, by adding said blowing rate adjusting value to said rate of blowing air in the absence of solar radiation; and control means for controlling said number of revolutions of said blower fan and said degree of opening of said open/close damper, based on a result of at least said solar radiation-absent blow-out air temperature calculation means; said solar radiation-absent blowing rate calculation means; said solar radiation-present blow-out air temperature calculation means; and said solar radiation-present blowing rate calculation means.

12. An air conditioning device for a vehicle which adjusts the number of revolutions of a blower fan in order to set the rate of blowing air to a desired value, and adjusts the degree of opening of an open/close damper, in order to set a temperature of an amount of blown air to a desired value, comprising:

solar radiation detection means which detects solar radiation;

desired blow-out air temperature calculation means which calculates a desired blow-out air temperature in the absence of solar radiation, based on a setpoint temperature and on a temperature inside and a temperature outside of said vehicle;

solar radiation-absent blow-out air temperature calculation means which calculates a desired blow-out air temperature in the absence of solar radiation, based on said setpoint temperature and on said temperature inside and said temperature outside of said vehicle;

solar radiation-absent blowing rate calculation means which calculates a rate of blowing air in the absence of solar radiation;

solar radiation-present blow-out air temperature calculation means which calculates a temperature of said blown air in the presence of solar radiation, by adjusting said temperature of said blown air in the absence of solar radiation based on said amount of solar radiation detected by said solar radiation detection means;

blowing rate adjusting value calculation means for calculating a blowing rate adjusting value, in compliance with a thermal equilibrium equation under the temperature conditions of blown air, in the presence of solar radiation;

solar radiation-present blowing rate calculation means which calculates a rate of blowing air, by adding said blowing rate adjusting value to said rate of blowing air in the absence of solar radiation; and control means for controlling said number of revolutions of said blower fan and said degree of opening of said open/close damper, based on a result of at least said solar radiation-absent blow-out air temperature calculation means; said solar radiation-absent blowing rate calculation means; said solar radiation-present blow-out air temperature calculation means; and said solar radiation-present blowing rate calculation means.

13. An air conditioning device for a vehicle according to claim 11 or 12, wherein said temperature of said blown air in the presence of solar radiation decreases with an increase in said detected amount of solar radiation, said decrease being limited.

* * * * *